United States Patent [19]

Hallowell et al.

[11] Patent Number: 5,822,600
[45] Date of Patent: Oct. 13, 1998

[54] DYNAMIC HIBERNATION TIME IN A COMPUTER SYSTEM

[75] Inventors: William C. Hallowell, Spring; Brian C. Fritz, The Woodlands, both of Tex.

[73] Assignee: Compaq Computer Corporation, Houston, Tex.

[21] Appl. No.: 684,133

[22] Filed: Jul. 19, 1996

[51] Int. Cl.$^6$ .................. G06F 1/00; G06F 1/28
[52] U.S. Cl. ................ 395/750.08; 395/182.2; 395/182.22
[58] Field of Search .............. 395/750, 182.13, 395/182.2, 182.22

[56] References Cited

U.S. PATENT DOCUMENTS

| | | | |
|---|---|---|---|
| 4,907,150 | 3/1990 | Arroyo et al. | 364/200 |
| 5,254,928 | 10/1993 | Young et al. | 320/14 |
| 5,386,552 | 1/1995 | Garney | 395/575 |
| 5,511,202 | 4/1996 | Combs et al. | 395/750 |
| 5,511,205 | 4/1996 | Kannan et al. | 395/750 |
| 5,535,401 | 7/1996 | Rawson, III et al. | 395/750 |
| 5,603,038 | 2/1997 | Crump et al. | 395/750 |
| 5,649,212 | 7/1997 | Kawamura et al. | 395/750 |

FOREIGN PATENT DOCUMENTS

| | | |
|---|---|---|
| 0 658843 A1 | 6/1995 | European Pat. Off. . |
| 0 704804 A1 | 4/1996 | European Pat. Off. . |
| 0 793175 A1 | 9/1997 | European Pat. Off. . |

OTHER PUBLICATIONS

Intel Corp., Intel 486 SL Microprocessor SuperSet Programmer's Reference Manual, Nov., 1992, pp. 6–28–6–53.
Philips Semiconductors, I$^2$C Spec. information—The I$^2$C Bus and how to use it (including specifications), 1993.
Intel Corp., System Management Bus Specification, Apr. 21, 1994 (Rev. 0.95).
Cates, Ron, et al., "Charge NiCd and NiMH Batteries Properly," Electronic Design, Jun. 10, 1996, pp. 118, 120, 122.
EET Special Edition, Part 2: Batteries—Power Technologies, Elec. Eng. Times, Apr. 8, 1996, pp. 39–82.

*Primary Examiner*—Ayaz R. Sheikh
*Assistant Examiner*—Jigar Pancholi
*Attorney, Agent, or Firm*—Pravel, Hewitt & Kimball

[57] ABSTRACT

A dynamic hibernation time apparatus monitors and ensures that battery packs in a computer system have sufficient energy capacity to sustain a proper saving of the hibernation file into the hard disk drive. The invention determines the memory size of the computer and adds the storage space needed to store the chip register contents to arrive at the determination of the hibernation file size. Next, the time necessary to save the hibernation file on the disk data storage device and the hibernation energy required to operate the disk data storage device to completely save the hibernation file are determined. When the battery capacity drops within a range of the previously computed hibernation energy, a warning message is generated at the user and the hibernation file is saved. The computer is shut down after the hibernation file has been properly saved. Thus, by determining the total memory size to be saved in the hibernation file, by determining the time and the energy required to completely store the hibernation file into the disk drive, and by sensing either the battery capacity or requesting that the smart battery sends an alarm to initiate the hibernation file saving process, the present invention ensures that sufficient energy exists in the battery packs to properly save the hibernation file onto the hard disk drive before system shut down occurs due to low battery capacity without wasting energy by determining the set point based on a maximum memory configuration.

13 Claims, 9 Drawing Sheets

DYNAMIC HIBERNATION TIME IN A COMPUTER SYSTEM

BACKGROUND OF THE INVENTION

1. Field of the Invention

The invention relates to a power management system in a computer, and more particularly, to a power management system for hibernating a computer.

2. Description of the Related Art

Personal computers are constantly evolving to provide a user with the highest performance available at the lowest cost. Performance improvements in the microprocessor, memory and data storage systems have resulted in personal computers so powerful that they are now capable of performing tasks that before could only be performed by large mainframe computers. The proliferation of personal computers is driven in part by the ever increasing performance of the electronic components and by the ever dropping prices of the computers.

Technological changes are especially exemplified in the area of portable and palmtop computers where power consumption efficiency needs to be balanced against features, cost, size, weight and performance. This is especially challenging since many computer users desire the portable computer be compact, lightweight and yet provide the same processing power as that of a desktop unit so that compute intensive applications, such as computer aided design, three dimensional animation, and video presentations, can be performed even if the user is on the road and does not have access to his or her desktop computer.

One problem associated with battery powered portable computer systems is the operating period per set of batteries. Although portable computer users prefer long operating time between battery recharge or replacement operations, the weight and space limits imposed by the physical structure of the portable computer provide a natural limit to the operating period that a set of battery can support. Many solutions have been proposed to reduce power consumption of a portable computer system, particularly when the system is not in use.

One solution used in portable computers with Intel's 486™ SL microprocessor provides a suspend hardware which allows the system to power-off with an application running after a predetermined period of user inactivity and resume the application transparently when the user continues work using the portable computer. In accordance with the Intel 486™ SL data sheet, the suspend mode is the maximum power saving mode as it eliminates all power usage except that required to retain the state of the computer system before power is removed. In the Intel 486™ SL system, before causing the computer system to enter the suspended mode, a suspend request handler saves the state of the computer memory such that the computer can return to the state it was in before the power down operation. In addition, register contents of the processor and peripheral components such as the 82360SL I/O chip need to be extracted from the components and saved either in a non-volatile RAM because the contents of these registers may be overwritten by a system management interrupt handler for resuming operation on the portable computer. Thus, for example, the 82360SL I/O chip contains certain standard ISA peripheral controllers, some of which have only write-only registers. For compatibility reasons, these registers cannot be modified. Therefore, these registers are shadowed in the 82360SL I/O chip such that their states can be accurately restored in the resume function. Thus, in addition to primary memory contents, the suspend code has to save the state of the registers of the processor as well as support chips for the resumption of processing when the computer is woke up.

In the event that the system is in suspension, activities directed at the computer, such as the assertion of the suspend/resume button pin or the opening of the lid of the computer, initiate a resume operation to remove the computer system from its suspend state. When a resume operation is initiated, the 82360SL chip restarts the CPU clock and causes a soft reset. During warm-boot, by examining the suspend status bit, the system BIOS can determine if a reset had been caused by a resume event. If the suspend status bit is set, the reset is a resume reset and control is passed to the system management interrupt (SMI) handler. In this manner, in the Intel 486™ SL, information saved by nonvolatile memory before the suspend operation is used by the SMI handler to restore the system to its original state prior to suspend.

Since the Intel 486™ SL suspend specification, computer vendors have added a variation known as hibernation where the contents of memory as well as the registers of the processor and support chips are stored in a disk file known as a hibernation file. The ability to store the hibernation file in the disk drive allows much larger system configurations to be stored, such as much multimegabyte main memory size, high resolution video memory, and related information to be economically stored in the computer system's already available disk drive. By using the disk drive in place of the non-volatile RAM, the computer system can hibernate even if memory intensive applications are loaded into memory. Further, by using an existing disk drive rather than adding an expensive non-volatile memory devices, the price of the computer system is kept minimal.

In conventional portable computers offering the hibernation capability, the hibernation trigger is typically activated after a fixed time interval or period of inactivity from the user. Although this solution is adequate when the battery pack powering the portable computer is fresh with an abundance of energy for supporting the operation of the disk drive, one problem with the conventional hibernation approach occurs when the battery pack is near its exhaustion point. At this point, not only do present systems write the hibernation file, they also preclude any further user activity—i.e., shut down. But, in high end portable computers where the main random access memory capacity may reach up to 150 MB, the hibernation file can be expected to be large. The writing of such large file to the disk drive can consume a significant amount of time and energy. Thus, it is possible for the portable computer system to run out of energy in the midst of writing the hibernation file to the disk drive if the remaining battery capacity of the battery is sufficiently low. Such an occurrence would be highly undesirable as the user may lose his or her data during the hibernation process. To forestall this, present solutions hibernate and shut down a predetermined period of time or energy before the batteries lose all power, where the time or energy is chosen to accommodate the maximum expected amount of random access memory to be placed in the system.

SUMMARY OF THE INVENTION

A dynamic hibernation time apparatus for use in a computer system is disclosed which monitors and ensures that battery packs in a computer system have sufficient energy capacity to properly save the hibernation file into the hard disk drive, but without wasting available battery charge. This is accomplished by first determining the memory size of the computer and adding the memory needed to store the chip register contents to arrive at the determination of the hibernation file size. Next, the time or energy is determined necessary to save the hibernation file to the disk data storage device. The battery capacity is then monitored for a drop below a predetermined threshold of the previously computed hibernation energy value. When that condition is true, a warning message is displayed to the user, the hibernation process is initiated to save the hibernation file, and the portable computer is shut down after the hibernation file has been properly saved.

Thus, by determining the total memory size to be saved in the hibernation file, by determining the time or the energy required to completely store the hibernation file into the disk drive, and by sensing either the battery capacity on a periodic basis or by requesting that a smart battery sends an alarm to initiate the hibernation file saving process, the present invention ensures that sufficient energy exists in the battery pack to properly save the hibernation file in the hard disk drive before a system shut down occurs due to the low battery capacity while maximizing the utilization of energy stored in the battery as the user can freely process data without the risk of losing data due to an insufficient battery capacity for hibernation purposes.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 08/684,582, entitled "BOOT DRIVE SELECTION AND HIBERNATION FILE DETECTION," by Philip Doragh and William C. Hallowell, filed concurrently herewith;

U.S. application Ser. No. 08/684,686, entitled "IMPROVED CONTROL OF COMPUTER AC ADAPTER OUTPUT VOLTAGE VIA BATTERY PACK FEEDBACK," by Brian C. Fritz, William C. Hallowell, Thomas Sawyers, Norman D. Stobert, Robert F. Watts, and Michael E. Schneider, filed concurrently herewith;

U.S. application Ser. No. 08/684,420, entitled "MULTI-FUNCTION POWER AND KEYBOARD CONTROLLER," by David J. Delisle, William C. Hallowell and Patrick R. Cooper, filed concurrently herewith;

U.S. application Ser. No. 08/684,413, entitled "FLASH ROM PROGRAMMING," by Patrick R. Cooper, David J. Delisle and Hung Q. Le, filed concurrently herewith;

U.S. application Ser. No. 08/684,414, entitled "FLASH ROM SHARING," by Hung Q. Le and David J. Delisle, filed concurrently herewith;

U.S. application Ser. No. 08/684,486, entitled "BUS SYSTEM FOR SHADOWING REGISTERS," by Dwight D. Riley and David J. Maguire, filed concurrently herewith;

U.S. application Ser. No. 08/684,412, entitled "CIRCUIT FOR HANDLING DISTRIBUTED ARBITRATION IN A COMPUTER SYSTEM HAVING MULTIPLE ARBITERS," by David J. Maguire, Dwight D. Riley and James R. Edwards, filed concurrently herewith;

U.S. application Ser. No. 08/684,485, entitled "LONG LATENCY INTERRUPT HANDLING AND INPUT/OUTPUT WHILE POSTING," by David J. Maguire and James R Edwards, filed concurrently herewith;

U.S. application Ser. No. 08/684,710, entitled "SERIAL BUS SYSTEM FOR SHADOWING REGISTERS," by David J. Maguire and Hung Q. Le, filed concurrently herewith;

U.S. application Ser. No. 08/684,584, entitled "APPARATUS AND METHOD FOR POSITIVELY AND SUBTRACTIVELY DECODING ADDRESSES ON A BUS," by Gregory N. Santos, James R. Edwards, Dwight D. Riley and David J. Maguire, filed concurrently herewith;

U.S. application Ser. No. 08/671,316, entitled "TWO ISA BUS CONCEPT," by Gregory N. Santos, James R. Edwards, Dwight D. Riley and David J. Maguire, filed concurrently herewith;

U.S. application Ser. No. 08/684,490, entitled "RECONFIGURABLE DUAL MASTER IDE INTERFACE," by Gregory N. Santos, David J. Maguire, William C. Hallowell and James R. Edwards, filed concurrently herewith; and U.S. application Ser. No. 08/684,255, entitled "COMPUTER SYSTEM INCORPORATING HOT DOCKING AND UNDOCKING CAPABILITIES WITHOUT REQUIRING A STANDBY OR SUSPEND MODE," by Richard S. Lin, David J. Maguire, James R. Edwards and David J. Delisle, filed concurrently herewith; all of which are assigned to the assignee of this invention.

Figure 1:
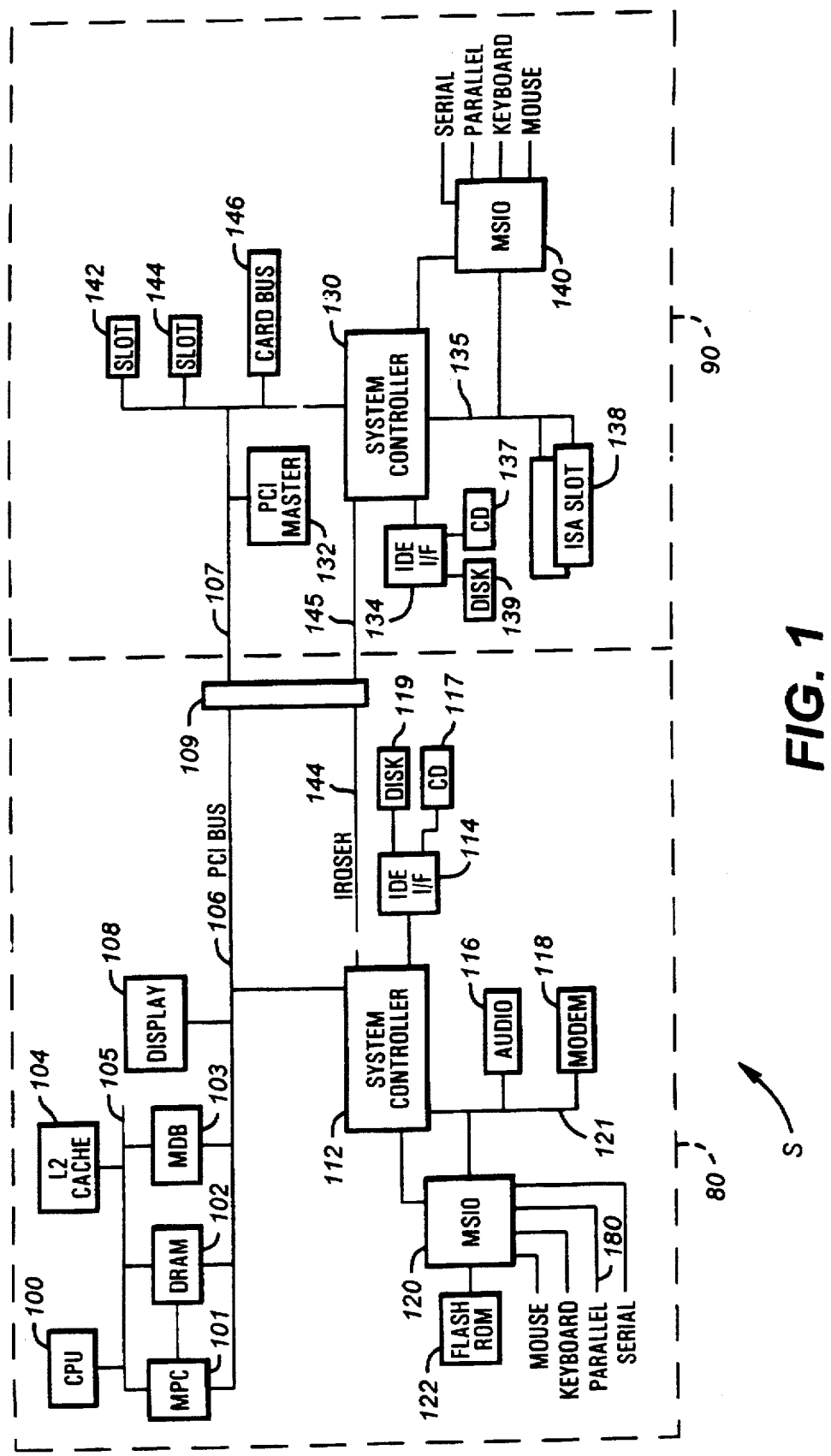
FIG. 1 is a block diagram of a computer system having a dynamic hibernation time device in accordance with the present invention.

Turning now to the drawings, FIG. 1 is a computer system S according to the present invention. In FIG. 1, the system S comprises a portable computer 80 and an expansion base unit 90. Within the portable computer 80, a CPU 100 and a level two (L2) cache 104 are connected to a high speed local bus 105. The processor 100 of the preferred embodiment is one of the 80×86 microprocessor family manufactured by Intel Corporation of Santa Clara, Calif. In the preferred embodiment, the processor operates with a standard IBM- PC compatible operating system, such as MS-DOS or Windows, available from Microsoft Corporation of Redmond, Wash. The L2 cache 104 provides additional caching capabilities to the processor's on-chip cache to improve performance.

In addition to the CPU 100 and cache 104, a number of memory interface and memory devices are connected between the local bus 105 and a PCI bus 106. These devices include a memory to PCI cache controller (MPC) 101, a dynamic random access memory (DRAM) array 102, and a memory data buffer (MDB) 103. The MPC 101 is connected to the DRAM array 102, which is further connected to the MDB 103. The MPC 101, DRAM array 102, and MDB 103 collectively form a high performance memory system for the computer system S. A video controller 108 is also connected to a PCI bus 106.

The PCI bus 106 is also connected to a system controller 112. The system controller 112 is a PCI to ISA bus bridge which also provides various support functions for the portable computer 80 and the expansion base unit 90 of the system S. Preferably the system controller 112 is a single integrated circuit that acts as a PCI bus master and slave, an ISA bus controller, an ISA write posting buffer, an ISA bus arbiter, DMA devices, and an IDE disk interface. The system controller 112 is connected to an audio controller 116 and a modem 118 as conventionally present in PC systems to provide sound and data communication capabilities for the system S via a first ISA interface 121. The system controller 112 is also connected to an IDE interface port 114 for driving one or more peripheral devices such as hard disk drives, preferably a CD-ROM player 117 and a disk drive 119. The peripheral devices such as the disk drives typically store boot data used during the initial power up of the computer system. Further, the system controller 112 provides a single pin output to support an interrupt serial bus (IRQSER) 144.

The system controller 112 is connected to an MSIO (mobile super I/O) chip 120. The MSIO 120 is connected to a flash ROM 122. The flash ROM 122 receives its control, address and data signals from the MSIO 120. Preferably, the flash ROM 122 contains the BIOS information for the computer system S and can be reprogrammed to allow for revisions of the BIOS. Additionally, the MSIO 120 provides a parallel port 180, a serial port, a floppy interface, a keyboard interface and a mouse interface, among others, for the computer system S.

A plurality of Quick Connect switches 109 are also connected to the PCI bus 106. Upon detecting a docking sequence between the portable computer 80 and the base unit 90, the Quick Connect switches 109 couple the PCI bus 106 and the IRQSER bus 144 to an expansion PCI bus 107 and an expansion IRQSER bus 145 on the base unit 90. The Quick Connect switches 109 are series in-line FET transistors having low $r_{ds}$, or turn-on resistance, values to minimize the loading on the PCI buses 106 and 107 and the IRQSER buses 144 and 145.

Turning now to the expansion base unit 90, one or more PCI masters 132 are connected on the expansion PCI bus 107, which is adapted to be connected to the PCI bus 106 over the Quick Switches 109 when the portable computer 80 is docked to the expansion base unit 90. The PCI bus 107 is also connected to PCI slots 142 and 144 and also to a card-bus interface 146 for accepting expansion cards. Also connected to the expansion PCI bus 107 is a second system controller 130, which is preferably a second integrated circuit of the same type as the system controller 112. The system controller 130 is configured to be the slave upon power up. As a slave, the write posting buffer is not available in the system controller 130. The system controller 130 is connected to the expansion PCI bus 107 and the interrupt serial bus 145. The system controller 130 supports additional drives 137 and 139 through an the IDE interface 134. The system controller 130 also supports an ISA bus 135 which is connected to one or more ISA slots 136–138. The system controller 130 is further connected to a second MSIO device 140, which provides a secondary parallel port, serial port, and floppy interface.

Thus, the system S, upon docking, may have multiple parallel ports, serial ports, keyboards, mice, and disk drives via the system controllers 112 and 130. Additionally, the system S may have a plurality of PCI and ISA type peripherals on their respective buses. The availability of a plurality of slots allows more peripherals to be connected to the system S and contributes to the useability and flexibility of the portable computer 80 when it is docked to the expansion base unit 90.

Figure 2:
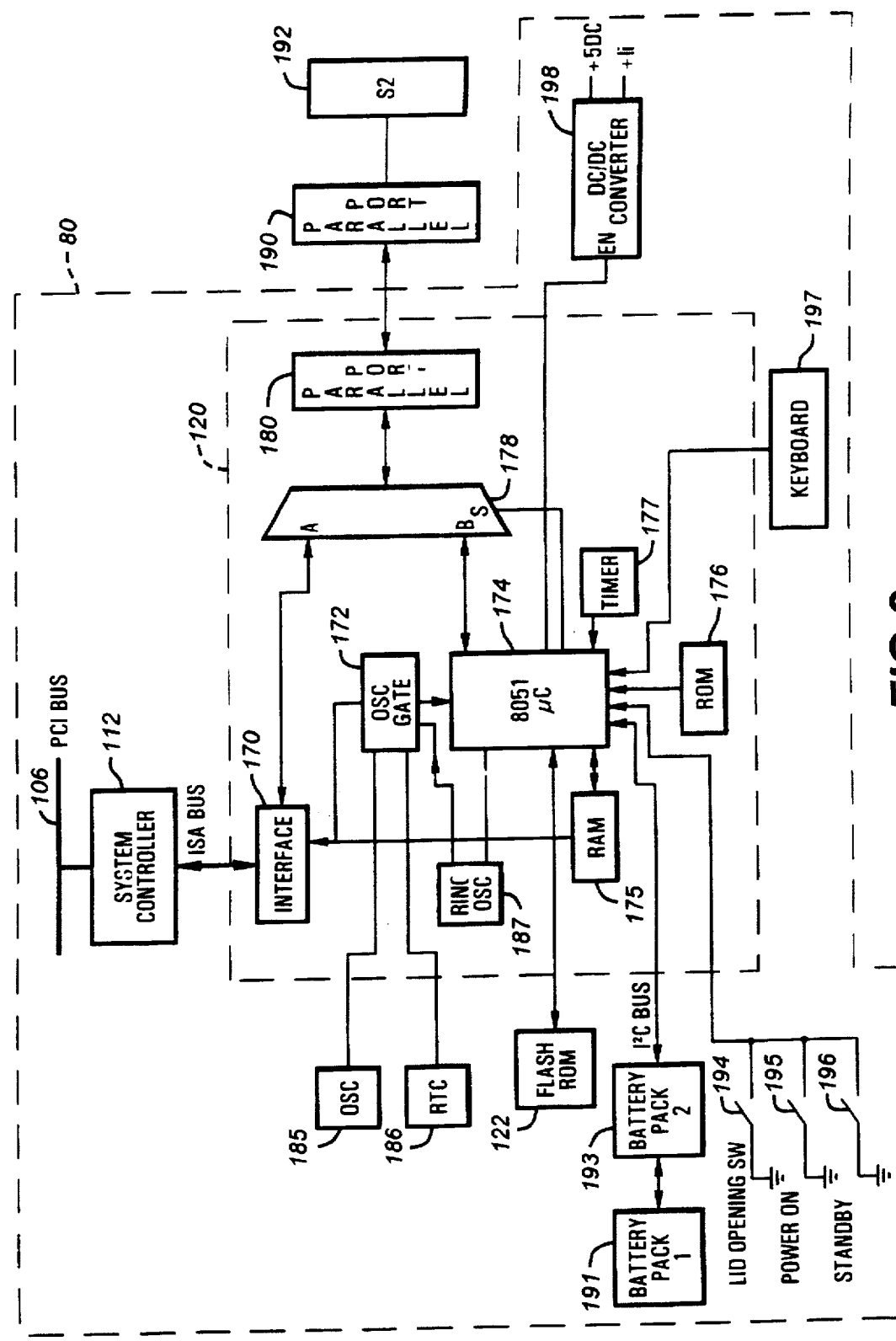
FIG. 2 is schematic block diagram of a microcontroller for performing the dynamic hibernation time device of the present invention.

Turning to FIG. 2, the circuitry of a microcontroller 174 for monitoring available battery energy is shown. The microcontroller 174 preferably communicates with smart batteries in determining remaining battery capacity, but can work with conventional battery as well via suitable battery capacity management and monitoring, as shown below. In FIG. 2, the system controller 112 communicates with the super I/O device (MSIO) 120 over the ISA bus. In the MSIO device 120, an interface unit 170 is connected to the ISA bus for receiving instructions from the CPU 100. The interface 170 provides a number of "mailbox" registers mapped into the I/O memory space to facilitate the interprocessor communication and coordination between the CPU 100 and a microcontroller 174. The interface 170 is connected to the enable input of an oscillator gating circuit 172 to allow the CPU 100 to control the generation of the clock to the microcontroller 174. The oscillator gating circuit, or the variable clock generator, 172 receives a clock signal which is externally generated by an oscillator 185. The oscillator gating circuit or variable clock generator 172 preferably receives a 14 MHz clock signal from the oscillator 185 and generates a programmable clock output that can be selected from 0 MHz, 12 MHz, 14 MHz, or 16 MHz. The oscillator 185 is active when the computer system 80 is in the on state.

Further, an external real time clock (RTC) oscillator 186 is connected to the oscillator gating circuit 172 to clock the RTC circuit (not shown) and to clock the 8051 microcontroller 174 when it is in a deep sleep mode. The RTC oscillator 186 which supports the updating of system time and date functions is constantly maintained even when the CPU 100 has been turned off. Thus, the RTC oscillator 186 is available as a last resort clock for the microcontroller 174 when it sleeps.

The deep sleep mode is an ultra low power mode where most sections of the microcontroller 174 are shut down to conserve power. This mode is a special mode that is provided as an enhancement to a standard 8051-compatible microcontroller cell. The deep sleep mode is entered when the standard 8051 IDLE instruction is executed with a particular register bit set. In this mode, the microcontroller 174 assumes that it will operate off a ring oscillator 187 and thus arms the ring oscillator 187 such that the ring oscillator 187 will wake up when certain events such as interrupts are presented to the microcontroller 174.

As discussed above, the internal ring oscillator 187 is connected to the oscillator gating circuit 172 to provide clock signals to the microcontroller 174 when the computer system 80 is in the standby mode or when the microcontroller comes out of its deep sleep. The ring oscillator 187 consists essentially of a number of inverters connected together in a looped series arrangement, with a pass transistor connected between the output of one inverter and the input of another inverter such that, upon turning off the pass transistor, the feedback is broken and the oscillation stops. The control gate of the pass transistor is connected to the microcontroller 174 such that the microcontroller 174 can wake up the ring oscillator 187 when certain internal and external events are encountered. The external events that wake up the microcontroller 174 include the actuation of the ring indicator from the modem, the standby button, the hibernation button, PCMCIA card detect, and the ring indicator. The internal events which wake up the microcontroller 174 include events relating to the real time clock alarm, the hibernation time, the keyboard, and the mouse, among others. The ring oscillator is available as a standard ASIC module from SMC Corporation of Hauppauge, N.Y. Finally, the output of the oscillator gating circuit 172 is provided to the clock input of the 8051 compatible microcontroller 174.

Other than the special clock circuits discussed above for the deep sleep feature, the 8051 compatible microcontroller 174 has a random access memory (RAM) 175 and a read only memory (ROM) 176 for storing boot-up instructions. The microcontroller 174 has a built-in timer 177 named Timer_0 which may be used to allow the microcontroller 174 to detect failures when the timer time-outs. The timer 177 is a count-up timer which interrupts at the rollover point. The timer 177's duration and count-up sequencing are controlled by the microcontroller 174. The timer 177 generates an interrupt to the microcontroller 174 upon the completion of its count sequence. The generation of the interrupt to the microcontroller 174 wakes the microcontroller 174 out of its idle mode so that the processing of the routines of the present invention can be performed. The timer 177 is used as a fail-safe mechanism to wake up the microcontroller in the event of power failures and other abnormal operating conditions.

Although a conventional timer can be used, the present invention also contemplates that a watchdog timer can be used in place of the timer 177. In the event that the watchdog timer is used, the software overhead on the microcontroller 174 is reduced, as the watchdog timer will reset the microcontroller 174 in event of an abnormal program execution. If the watchdog timer is not periodically reset by the microcontroller 174, the counter in the watchdog timer overflows, causing the microcontroller 174 to be reset. The watchdog timer thus restarts the microcontroller 174 in abnormal situations, providing for recovery from a hardware or software error.

The microcontroller 174 is also connected to the select input of a two-to-one multiplexer 178. The B input of the multiplexer 178 is connected the input/output lines of the microcontroller 174. The A input of the multiplexer 178 is connected to the interface 170 for transferring data from the parallel port directly to the processor 100 via the system controller 112. The microcontroller 174 has an output connected to the select input S of the multiplexer 178 to control the routing of data from the parallel port 180 to either the interface 170 or the microcontroller 174. The output of the multiplexer 178 is connected to the parallel port 180. The interface 170 and the microcontroller core 174 are connected to the flash ROM 122. Finally, the parallel port 180 communicates with a parallel port 190 (FIG. 2) which is driven by a second computer system 192. The second computer system 192 contains uncorrupted data such as a new valid BIOS to be loaded to the flash ROM 122.

Additionally, the microcontroller 174 of FIG. 2 receives battery information from one or more battery packs 191 and 193 over an inter-integrated circuit (I²C) bus. The inter-integrated circuit (I²C) bus is a simple bi-directional two wire bus for efficiently controlling multiple integrated chips. Details of the I²C bus can be found in the "The I²C-Bus and How to Use It (Including Specification)," published by Phillips Semiconductors, January 1992. Briefly, the I²C bus consists of two lines: a serial clock (SCL) and a serial data line (SDA). Each of these lines is bi-directional. The SCL line provides the clock signal for data transfers which occur over the I²C bus. Logic levels for this signal are referenced to VBATT–, which is common to all installed battery packs B. The SDA line is the data line for data transfers which occur over the I²C bus. Again, logic levels for this signal are referenced to VBATT–. As illustrated by a second installed battery pack 193, the battery microcontroller of any additional battery pack is also coupled to the MSIO 120 via the I²C bus. Low value series resistors (not shown) are typically provided at each device connection for protection against high-voltage spikes.

Each device connected to the I²C bus is recognized by a unique address—whether it is the MSIO 120 or the battery microcontroller of any installed battery packs 191 and 193. Both the MSIO 120 and battery microcontroller incorporate an on-chip interface which allows them to communicate directly with each other via the I²C bus. Using the I²C bus in cooperation with the master battery signal MSTR_BAT reduces the number of interface signals necessary for efficient battery management. co-pending U.S. patent application Ser. No. 08/573,296, entitled "BATTERY PACK WAKEUP" and filed on Dec. 15, 1995, now abandoned, illustrates various aspects of nickel-based and lithium ion battery packs and communications over a serial bus. This application is hereby incorporated by reference.

Further, the microcontroller 174 also receives inputs from a plurality of switches, including a computer lid opening switch 194, a power on switch 195, and a standby switch 196. The lid opening switch 194 senses when the lid of the computer system 80 is opened, indicating that the user is about to activate the computer system 80. The power on switch 195 allows the user to turn on the portable computer 80, while the standby switch 196 allows the user to put the portable computer system 80 to an idle mode or a sleep mode to conserve power. Preferably, the actuation of the switches 194, 195 and 196 generates an interrupt to the microcontroller 174 and causes the microcontroller 174 to exit its deep sleep mode, if the microcontroller 174 is in such a mode, and further causes the microcontroller 174 to branch to an appropriate interrupt handler to respond to the actuation of the switches or the insertion/removal of the battery packs 191 and 193.

Finally, the microcontroller 174 is connected to a keyboard 197 for receiving data entries from the user. The microcontroller 174 is further connected to a DC/DC converter 198 which provides regulated +5 VDC and +12 VDC to the VCC2 plane to power the portable computer 80. The DC/DC converter receives a DC voltage supplied by an AC/DC converter (not shown) which is connected to the AC power at a docking station (not shown). When the portable computer unit 80 is docked with its docking station, it communicates with peripheral devices, receives DC currents for charging batteries plugged into the portable computer 80 and for operating the portable computer unit 80. The DC/DC converter 198 has an enable input driven by the microcontroller 174 such that the microcontroller 174 can turn on or off the DC/DC converter 198. The battery packs 191 and 193 may be a conventional Nicad or Lithium rechargeable battery or they may be consumable, one-time use type of battery. However, as conventional batteries are less predictable with respect to their energy capacity, the battery packs 191 and 193 are preferably smart batteries which offers power management, precise charge control, accurate capacity monitoring and extensive data logging capability, and can communicate battery information to the microcontroller 174 which ultimately communicates such information to the CPU 100.

Figure 3:
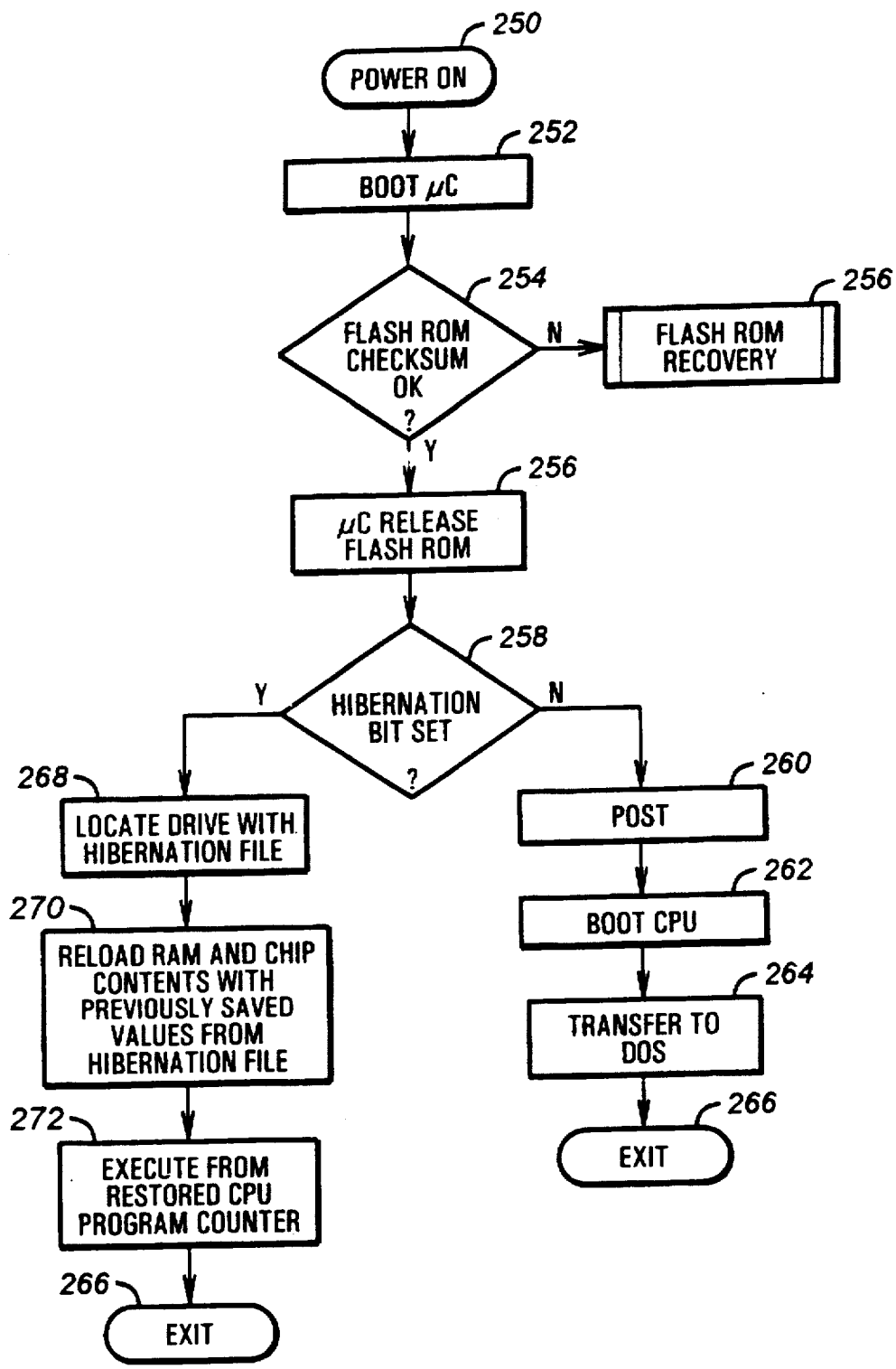
FIG. 3 is a flow chart of a power-on sequence which is executed by the computer system of FIG. 1.

Turning now to FIG. 3, the process for powering-on the computer system of FIG. 1 is disclosed in more detail. In FIG. 3, upon entry to the power-on routine, the microcontroller 174 boots up first in step 252. In step 252, the microcontroller 174 boots from its internal ROM and performs various low level system tests. Next, in step 254, the microcontroller 174 checks if the content of the flash-ROM 120 is acceptable in step 254. If the content of the flash-ROM 122 has been corrupted, the routine of FIG. 3 performs a flash-ROM 122 recovery routine in step 256. The flash-ROM 122 recovery routine of step 256 is discussed in more detail in the previously-incorporated-by-reference application entitled "FLASH-ROM PROGRAMMING".

Alternatively, in the event that the flash-ROM 122 passes the checksum test, the routine of FIG. 3 causes the microcontroller 174 to release the flash-ROM 122 to the CPU 100 in step 256. From step 256, the CPU 100 handles the processing of the rest of the routine of FIG. 3. In step 258, the routine of FIG. 3 checks if a hibernation bit has been set, indicating that the portable computer system 80 has previously been placed into a hibernation mode to conserve battery power. If not, the routine proceeds from step 258 to step 260 where the CPU 100 executes a power-on-self-test (POST) routine. The POST routine tests the microprocessor, memory and other hardware components for their presence and correct operation. The POST routine also initializes various interrupt vector table entries with default values pointing to interrupt handler routines in the system BIOS. The POST routine also calls a user set-up program for configuring the hardware and loads an operating system from the selected boot disk drive into main memory after POST completes its operation.

From step 260, the routine of FIG. 3 boots up the portable computer system 80 in step 262. The routine of FIG. 3 then transfers control to the disk operating system (DOS) in step 264 before the routine of FIG. 3 is exited in step 266.

From step 258, in the event that the hibernation bit has been set, the routine transitions from step 258 to step 268 to determine the drive where the hibernation file is stored. Generally, the drive is assumed to be the hard disk drive in the hard disk bay of the portable computer 80, as the chance that the boot hard disk will be removed from the hard disk bay is less than the chance that the hard disk will be removed from the multi-bay. From step 268, the routine reloads the RAM and the chip contents with the saved value from the hibernation file stored in the data storage device of step 268. At this point, the portable computer system 80 is restored to the identical state prior to its entry into the standby and hibernated state to conserve energy. Next, the routine executes from the last saved program counter in step 272 and the CPU 100 resumes processing from the point where it was last suspended.

Figure 4:
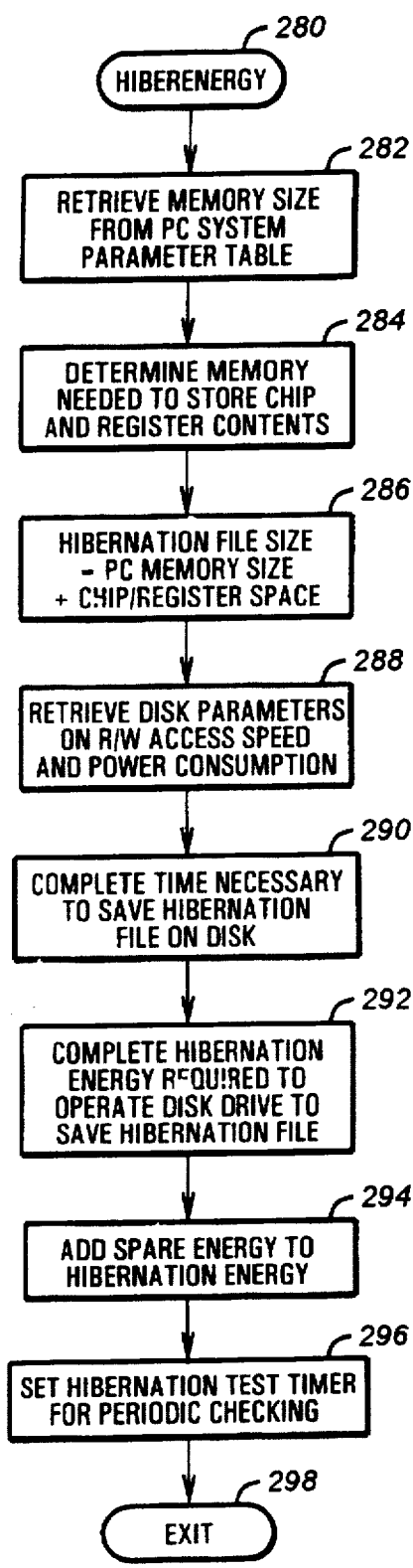
FIG. 4 is a flow chart of the process for determining a hibernation energy value in accordance with the hibernation power management system of the computer system of FIG. 1.

Turning now to FIG. 4, the routine to compute the hibernation energy value required to store the hibernation file is disclosed. The routine of FIG. 4, HIBENERGY 280, first retrieves a main memory size from the personal computer's system parameter table in step 282. The memory size is normally determined during the boot-up time by the BIOS when it performs various memory sizing and diagnostic operations. Additionally, in the event that the portable computer system 80 has received additional system memory via expansion ports such as a PCMCIA port (not shown), step 282 queries the expansion ports connected to the portable computer system 80 and adds the memory size associated with the memory in the expansion cards to the system memory size retrieved in step 282.

From step 282, the HIBENERGY routine 280 further determines the memory needed to store register contents from the peripheral support chips as well as the CPU in step 284. Next, the HIBENERGY routine 280 determines a hibernation file size value by adding the system memory available to the portable computer 80, as determined in step 282, with the storage space required for saving chip and CPU register contents, as determined in step 284. From step 286, the HIBENERGY routine 280 retrieves disk related information stored in a parameter table. From these parameters, the HIBENERGY routine 280 derives information relating to the read/write access speed as well as the power consumption characteristics to disk drives mounted to the portable computer system 80 in step 288. This is done, for example, by examining a lookup table with information for known drives in terms of milliwatts per period of time. For example, there can be a default, maximum consumption value for unknown drives. The disk parameter querying step is disclosed in more detail in the previously-incorporated patent application entitled "BOOT DRIVE SELECTION AND HIBERNATION FILE DETECTION".

From step 288, the HIBENERGY routine 280 computes the time or energy necessary to save the hibernation file on the disk drive in step 290. Essentially, step 290 divides the hibernation file size by the disk drive's write speed to arrive at the time required to write the hibernation file to the disk drive. Next, from step 290, the HIBENERGY routine 280 computes the hibernation energy required to operate the disk drive for the time period determined in step 290 to save the hibernation file in step 292. This step is accomplished by multiplying the time required to save the hibernation file with the power consumption parameter on the disk drive.

Although these two steps are shown as computing energy based on time, other techniques could be used, such as energy per megabyte written. Alternatively, an empirically derived lookup table can be used for a portable's internal hard drive. In any case, the amount of energy necessary to save the hibernation file is determined. Once the hibernation energy has been determined in step 292, the HIBENERGY routine 280 adds a predetermined spare energy number to the hibernation energy computed in step 292. The padding of the hibernation energy value ensures that the portable computer 80 has sufficient energy reserve to save the entire hibernation file, even if unanticipated power consumption arises during the hibernation shut-down process. Further, as conventional batteries are used in this process, the HIBENERGY routine 280 sets a hibernation test timer in step 296 such that the portable computer 80 periodically checks the remaining battery capacity and performs the hibernation shut-down procedure, if necessary. From step 296, the HIBENERGY routine 280 exits in step 298. Although an absolute energy computation is preferred, the energy necessary to store the hibernation file can alternatively be computed and stored in a relative sense, such as a percentage of total or full battery capacity available.

Figure 5:
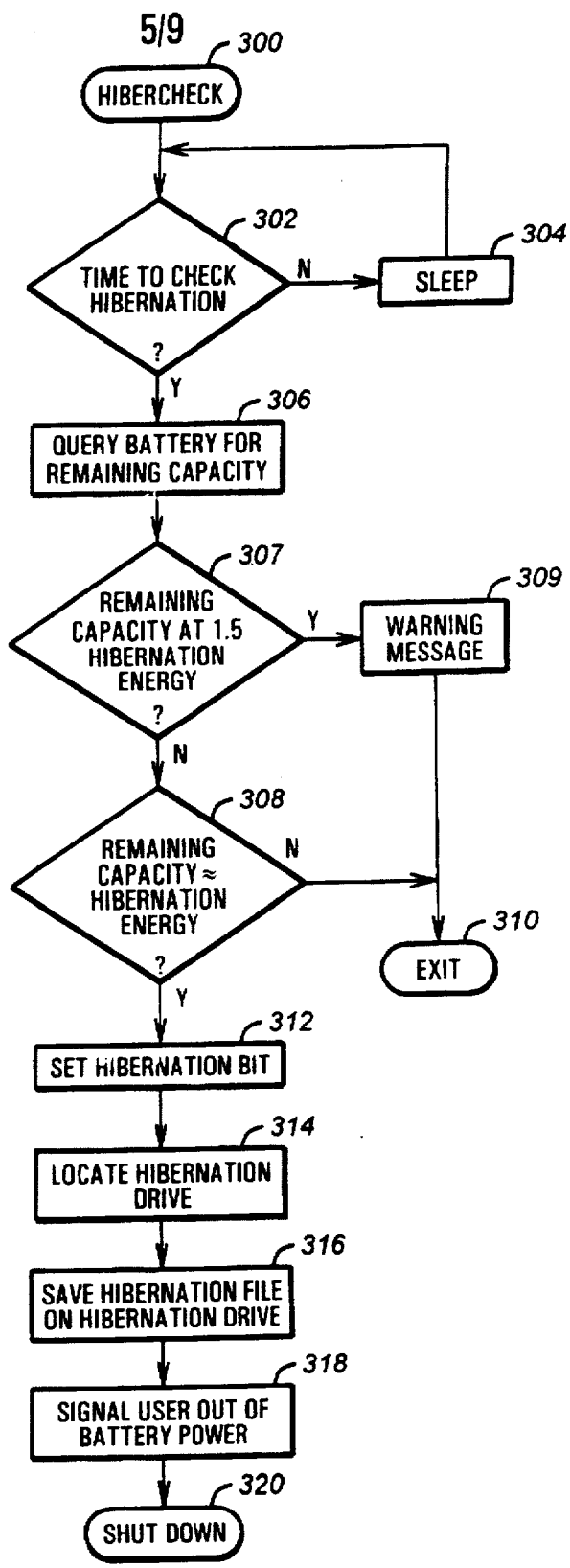
FIG. 5 is a flow chart illustrating the process for hibernating the computer system of FIG. 1 when conventional batteries are used.

Turning now to FIG. 5, the routine to perform the hibernation shut-down is shown in more detail. In FIG. 5, a HIBERCHECK routine 300 is installed after the portable computer 80 has successfully booted in FIG. 3. In the HIBERCHECK routine 300, the routine first determines whether it is time to check for hibernation activities in step 302. If not, the routine puts itself to sleep in step 304. Periodically, the routine comes out of step 304 and proceeds to step 302 to once more check on the need for performing hibernation checking activities in step 302. When it is time to check on hibernation activities, the HIBERCHECK routine 300 transitions from step 302 to step 306, where it queries the conventional battery for its remaining battery capacity. As discussed earlier, the remaining battery capacity is determined using a fuel gauging process. The fuel gauging process essentially determines how much useful charge remains in the battery and is typically accomplished by counting Coulombs.

From step 306, the HIBERCHECK routine 300 checks in step 307 whether the remaining capacity is at a predetermined multiple of the hibernation energy or not. If so, the HIBERCHECK routine 300 transitions from step 307 to step 309 where it issues a warning message to the user before the HIBERCHECK routine 300 is exited in step 310. Preferably, the predetermined multiple value of 1.5 is used to simply provide a warning message when battery capacity is down approximately to 1.5 times the energy required to save the hibernation file. However, the present invention contemplates that any other suitable value greater than 1.0 can be used to generate warning messages in step 309.

From step 307, if the remaining capacity is less than the predetermined multiple of the hibernation energy, the routine 300 checks if the remaining capacity is within a predetermined range of the hibernation energy value in step 308. From step 308, if the remaining capacity is greater than the hibernation energy value threshold, the HIBERCHECK routine 300 simply exits in step 310.

Alternatively, in the event that the remaining capacity is approximately equal to the determined hibernation energy value threshold in step 308, the routine 300 sets a hibernation bit in step 312. Next, the routine locates a suitable hibernation drive in step 314. The hibernation drive selection process is disclosed in more detail in the previously incorporated by reference patent application entitled "BOOT DRIVE SELECTION AND HIBERNATION FILE DETECTION".

From step 314, the HIBERCHECK routine 300 of FIG. 5 saves the hibernation file on the hibernation drive determined in step 314. Next, the routine in step 318 signals the user that a shutdown is in progress in step 318 before it performs the shut-down process in step 320. The shut-down process is essentially implemented by directing an electronic switch to isolate the main power supply rail from the power source.

Figure 6:
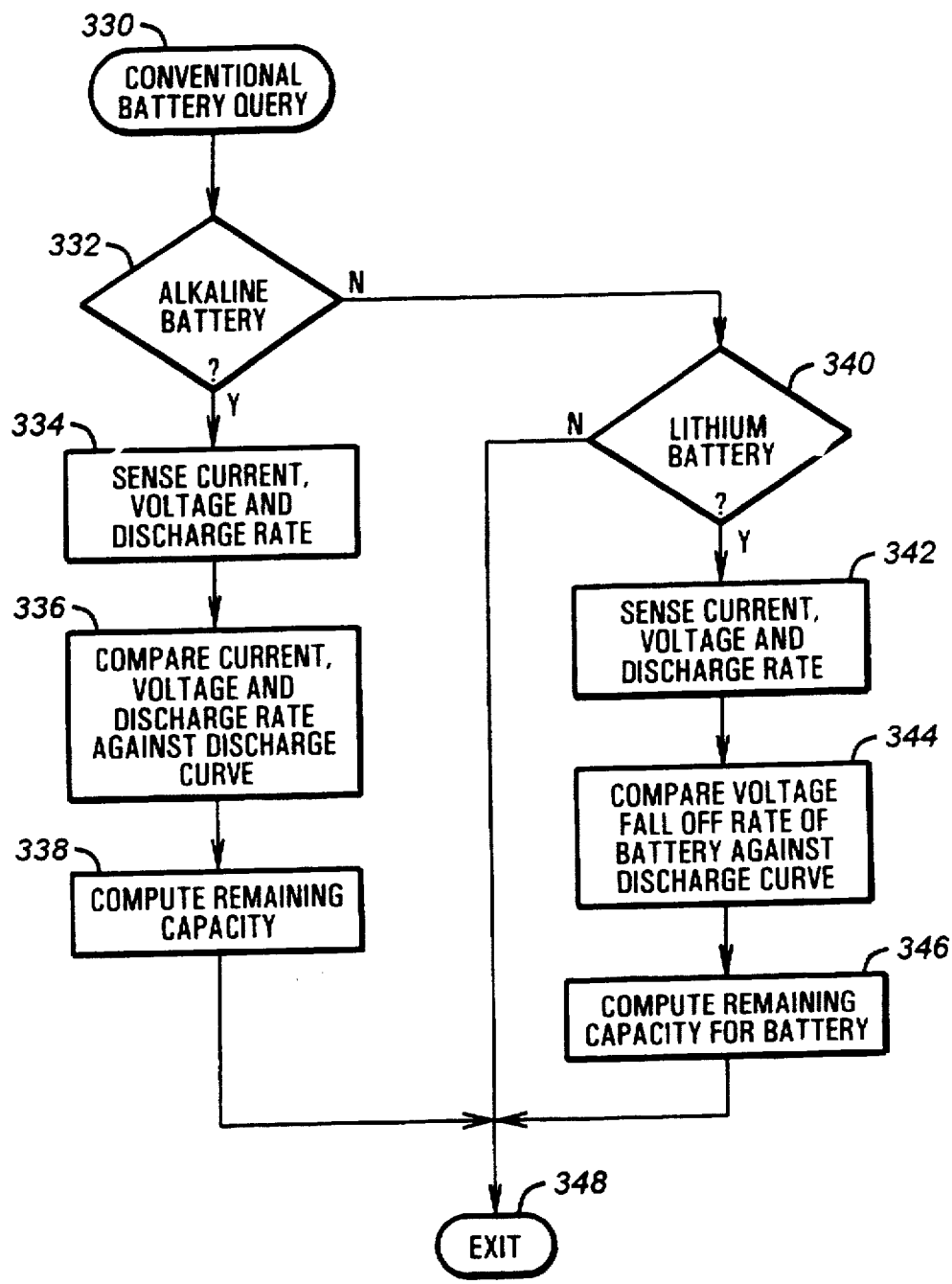
FIG. 6 is a flow chart of a process for querying a conventional battery for remaining capacity in accordance with the present invention.

Turning now to FIG. 6, the process for querying a conventional battery is shown. In the routine CONVENTIONAL_BATTERY_QUERY 330, the appropriate battery type is determined and the appropriate actions are taken. In step 332, the CONVENTIONAL_BATTERY_QUERY routine 330 determines the type of battery such as alkaline or lithium for remaining capacity monitoring and management purposes. If so, the routine 330 causes voltage and current sensors coupled to the microcontroller 174 to sense the current, voltage and the discharge rate in step 334. From step 334, the CONVENTIONAL_BATTERY_QUERY routine 330 of FIG. 6 compares the observed current, voltage and discharge rate against a predetermine discharge curve in step 336. Preferably, the predetermined discharge curve of step 336 is stored as a table in the DRAM 102 of the portable computer unit 80. From step 336, the routine CONVENTIONAL_BATTERY_QUERY 330 computes the remaining capacity in step 338 before it exits in step 348.

From step 332, in the event that the battery is not alkaline type battery, the routine 300 further checks to see if the battery is a lithium type battery. If so, the routine transitions from step 340 to step 342 where it senses the current, voltage and discharge rate of the battery. Next, the CONVENTIONAL_BATTERY_QUERY routine 330 compares the voltage fall-off rate of the battery against a predetermined lithium battery discharge curve stored in the DRAM 102 in step 344. From step 344, the routine CONVENTIONAL_BATTERY_QUERY 330 computes the remaining battery capacity for the battery in step 346 before it exits in step 348. The routine 330 of FIG. 6 thus detects the appropriate battery type and applies the appropriate process for determining remaining battery capacity.

Figure 7:
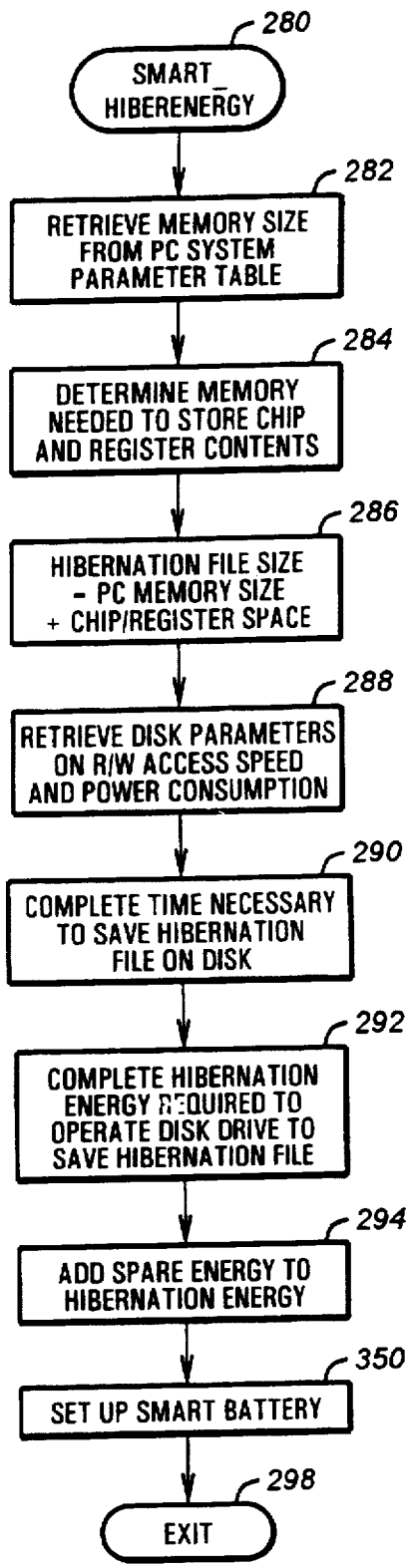
FIG. 7 is a flow chart illustrating the process for determining the hibernation energy and setting up a smart battery in accordance with the present invention.

FIG. 7 describes the process for computing data related to the hibernation process and for configuring intelligent or smart batteries with the computed hibernation data. Smart batteries are described in a publication entitled "Smart Battery Data Specification," revision 1.0, Feb. 15, 1995, by Intel Architectural Lab located in Portland, Oreg. and Duracell, Inc., located in Bethel, Conn. In FIG. 7, a routine SMART_HIBENERGY 280 performs various computations necessary to arrive at a hibernation energy threshold required to properly operate the disk drive to save the hibernation file. Further, the routine SMART_HIBENERGY 280 also sets up the smart battery to instruct the smart battery to interrupt the processor whenever its battery capacity falls below a predetermined threshold. The routine of FIG. 7 is very similar to that of the routine of FIG. 4, and thus the description of commonly-numbered steps and processes of FIG. 4 also applies to those of FIG. 7. FIG. 7 differs from FIG. 4 in that step 296 of FIG. 4 has been replaced by a step 350 which sets up the smart battery, as disclosed in more detail in FIG. 8.

Figure 8:
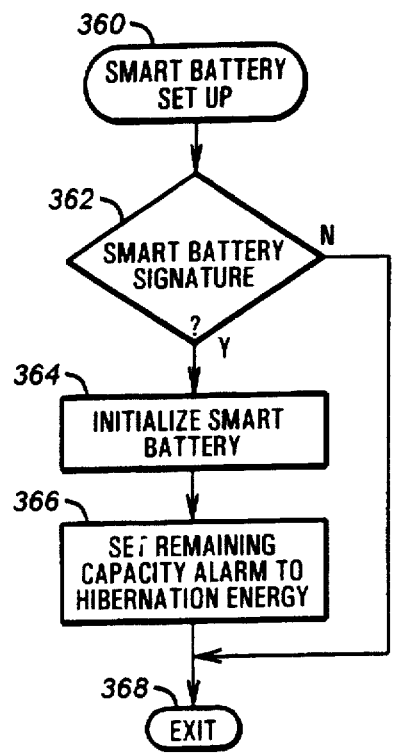
FIG. 8 is a flow chart illustrating the process for setting up the smart battery in FIG. 7.

In FIG. 8, a SMART_BATTERY_SETUP routine 360 is illustrated. Upon entry to the SMART_BATTERY_SETUP routine 360, the microcontroller 374 determines whether or not the battery packs 191 and 193 are smart batteries by examining the signature of the battery packs 191 and 193. If the battery packs 191 and 193 do not exhibit their smart battery signatures, the SMART_BATTERY_SETUP routine 360 simply exits in step 368. Alternatively, if the battery packs 191 and 193 are smart batteries, the routine 360 initializes the smart battery in step 364. From step 364, the SMART_BATTERY_SETUP routine 360 programs the smart battery packs 191 and 193 with a remaining capacity alarm value such that the battery packs 191 and 193 would interrupt the microcontroller 174 whenever the battery capacity is within a predetermined range of the hibernation energy threshold in step 366. After the smart battery has been programmed, whenever the remaining capacity in the battery packs 191 and 193 falls below the set alarm value, the battery packs 191 and 193 send alarm warning messages to the microcontroller 174. Thus, the remaining capacity alarm function on the smart battery notifies the microcontroller 174 of an impending power outage such that the portable computer 80 has time to transition to the suspend or hibernate state. From step 366, the SMART_BATTERY_SETUP routine 360 transitions to step 368 to exit the process of FIG. 8.

Figure 9:
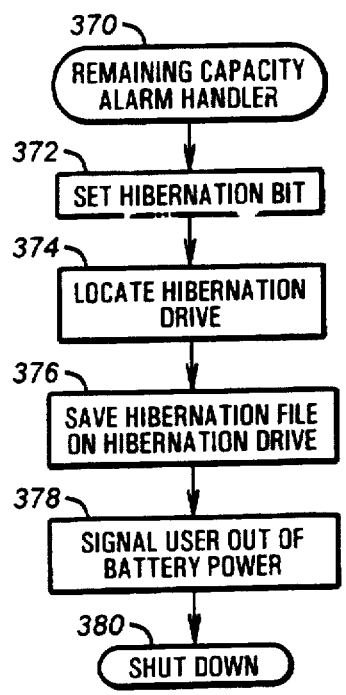
FIG. 9 is a flow chart illustrating the steps for hibernating the computer system of FIG. 1 when smart batteries are utilized.

Turning now to FIG. 9, the routine to handle the alarm generated by the smart battery packs 191 and 193 is shown.

In FIG. 9, a REMAINING_CAPACITY_ALARM_ HANDLER 370 is normally installed during the boot-up phase of the portable computer 80. The REMAINING_ CAPACITY_ALARM_HANDLER 370 is executed whenever it receives an interrupt from the battery packs 191 and 193 indicating that the capacity of the battery packs 191 and 193 has fallen below the previously set remaining capacity alarm value of FIG. 8. From step 370, the REMAINING_ CAPACITY_ALARM_HANDLER routine of FIG. 9 sets a hibernation bit in step 372. Next, from step 372, the routine locates the appropriate hibernation drive in step 374. The hibernation file is saved on the hibernation drive in step 376. After the hibernation file has been successfully saved, the REMAINING_CAPACITY_ALARM_HANDLER routine 370 of FIG. 9 signals the user that a shutdown is impending in step 378 before the routine actually shuts down the portable computer 80 in step 380.

Figure 10:
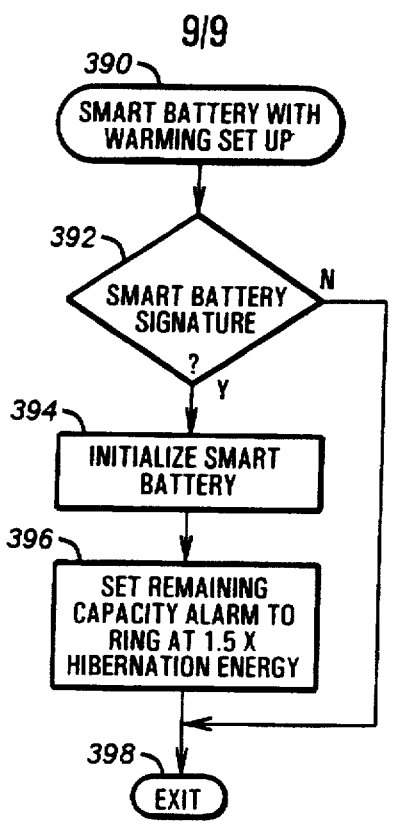
FIG. 10 is a flow chart illustrating the process for setting up smart batteries such that a warning message will be sent to the user at a predetermined period before hibernation.
Figure 11:
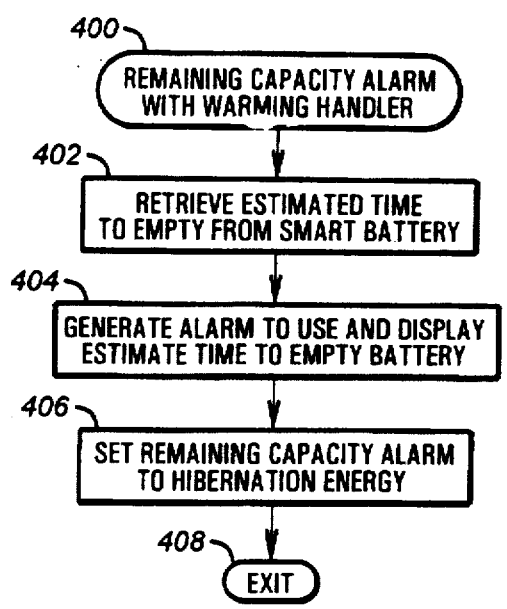
FIG. 11 is a flow chart illustrating the process for hibernating the computer system of FIG. 1 with the warning message of FIG. 10 when smart batteries are utilized.

FIGS. 10 and 11 illustrate the processes for generating advance warning messages to users when smart batteries are used. Turning now to FIG. 10, a SMART_BATTERY_ WITH_WARNING_SETUP routine 390 is disclosed. After booting up, the SMART_BATTERY_WITH_ WARNING_SETUP routine is executed. In step 392, the routine determines whether or not the battery packs 191 and 193 are smart batteries in step 392. If not, the routine of FIG. 10 exits in step 398. Alternatively, if the signature of the battery packs 191 and 193 indicate that they are smart batteries in step 392, the routine transitions to step 394 where the batteries are initialized. From step 394, the routine sets the remaining capacity alarm to ring at a predetermined multiple of the hibernation energy threshold, preferably at approximately 1.5 times the hibernation energy threshold. From step 396, the smart battery with warning setup routine 390 exits in step 398. Although the multiple value of 1.5 is used in step 396, the present invention contemplates that any value greater than 1.0 may be used to as the basis for generating the alarm message to warn the user well in advance of the impending hibernation.

Turning now to FIG. 11, the corresponding routine to display warning messages to the user upon receipt of a hibernation is disclosed. In FIG. 11, a REMAINING_ CAPACITY_ALARM_WITH_WARNING handler routine 400 is shown. Starting from step 402, the routine 400 retrieves the estimated time to empty from the smart battery in step 402. The time to empty information of step 402 is maintained by the controller within the smart battery packs. The maintenance of each battery's own information allows for a mixture of batteries, such as different chemistries and/or charge states to be used in a device. As each smart battery accurately reports its own characteristics, the information provided to the computer system relating to the expected energy capacity and provides the computer system with accurate state of charge information along with an accurate prediction of the remaining operating time.

In accordance with the Intel-Duracell smart battery data specification, the routines AT_RATE( ) and the routine AT_RATE_TIME_TO_EMPTY( ) may be used to determine the remaining operating time given the AT_RATE value.

Once the estimated time to empty has been determined in step 402, the routine 400 proceeds to generate an alarm to the user in step 404. Further, step 404 displays the estimated time to empty value. Such messages allow the user to proceed with closing down certain files and saving important files if necessary. From step 404, the REMAINING_ CAPACITY_ALARM_WITH_WARNING handler routine 400 sets the remaining capacity alarm to the predetermined hibernation energy value in step 406. Next, the routine 400 exits in step 408. After the routine of FIG. 11 completes operation, the next time that the remaining capacity alarm is actuated, the portable computer system 80 executes the REMAINING_CAPACITY_ALARM_ HANDLER routine 370, as shown in FIG. 9. The execution of the REMAINING_CAPACITY_ALARM_HANDLER routine 370 causes the portable computer 80 to complete the hibernation process and shut itself down, as previously discussed.

Thus, by determining the total memory size to be saved in the hibernation file, by determining the time and the energy required to completely store the hibernation file into the disk drive, and by sensing either the battery capacity or requesting that the smart battery sends an alarm to initiate the hibernation file saving process, the present invention ensures that sufficient energy exists in the battery packs to properly save the hibernation file onto the hard disk drive before system shut down occurs due to low battery capacity, but without wasting available capacity. Although the disclosed embodiment is based on remaining available energy, an exclusive time-based system could also be used, where the system hibernates at a variable time before battery empty, where the time is selected based on memory size.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for hibernating a computer, said computer having a hibernation file, a memory, a data storage device and a battery, said battery having a battery capacity, said data storage device having a write speed parameter and an energy consumption parameter, said method comprising the steps of:

determining the size of said hibernation file;

determining a suitable hibernation energy level required to operate said data storage device until said hibernation file has been saved based on said determined size;

determining when said battery capacity drops to said determined hibernation energy level; and hibernating said computer when said battery capacity drops to said determined hibernation energy level, wherein the suitable hibernation energy level determining step further comprises the step of retrieving said write speed and energy consumption parameters from said data storage device.

2. The method of claim 1, wherein the step of determining the suitable hibernation energy level further comprises the step of computing the time necessary to save said hibernation file on said data storage device using said write speed parameter.

3. The method of claim 2, wherein the step of determining the suitable hibernation energy level further comprises the step of computing a hibernation energy required to operate said data storage device to save said hibernation file using said time and said energy consumption parameter.

4. The method of claim 3, wherein said computing a hibernation step further comprises the step of padding said hibernation energy to provide for spare energy capacity.

5. The method of claim 4, wherein said battery capacity determining step determines remaining battery capacity in ampere hours.

6. An apparatus for hibernating a computer, said computer having a hibernation file, a memory, a data storage device and a battery, said memory having a memory size, said data storage device having a write speed parameter and an energy consumption parameter, said battery having a battery capacity, said apparatus comprising:
   a processor coupled to said memory, said data storage device and said battery;
   a memory analyzer coupled to said hibernation file for determining the size of said hibernation file;
   a hibernation energy analyzer coupled to said memory analyzer and said processor, said hibernation energy analyzer determining a hibernation energy level required to operate said data storage device until the hibernating process is completed;
   a battery capacity monitor coupled to said battery and said processor, said battery capacity monitor asserting an output when said battery capacity drops below said hibernation energy level; and
   a file saver coupled to said hibernation file, said data storage device, said battery capacity monitor and said processor, said file saver writing the content of said hibernation file to said data storage device when said battery capacity monitor output is asserted, wherein the hibernation energy analyzer further comprises a parameter extractor coupled to said processor and to said data storage device, said parameter extractor retrieving said write speed and energy consumption parameters from said data storage device.

7. The apparatus of claim 6, the hibernation energy analyzer further comprising a time analyzer coupled to said parameter extractor, said time analyzer determining the time required to save said hibernation file on said data storage device using said write speed parameter.

8. The apparatus of claim 7, wherein said hibernation energy analyzer generates said hibernation energy level as a function of said time and energy consumption parameters.

9. The apparatus of claim 8, the hibernation energy analyzer further comprising a hibernation energy padder coupled to said hibernation energy analyzer, said hibernation energy padder providing a spare energy capacity to said computer.

10. A computer system, comprising:
    an expansion base unit; and
    a portable computer coupled to said expansion base unit, said portable computer having a hibernation file, a memory, a data storage device and a battery, said memory having a memory size, said data storage device having a write speed parameter and an energy consumption parameter, said battery having a battery capacity, said portable computer comprising:
      a processor coupled to said memory, said data storage device and said battery;
      a memory analyzer coupled to said hibernation file for determining the size of said hibernation file;
      a hibernation energy analyzer coupled to said memory analyzer and said processor, said hibernation energy analyzer determining a hibernation energy level required to operate said data storage device until the hibernating process is completed;
      a battery capacity monitor coupled to said battery and said processor, said battery capacity monitor asserting an output when said battery capacity drops below said hibernation energy level; and
      a file saver coupled to said hibernation file, said data storage device, said battery capacity monitor and said processor, said file saver writing the content of said hibernation file to said data storage device when said battery capacity monitor output is asserted;
      wherein the hibernation energy analyzer further comprises a parameter extractor coupled to said processor and to said data storage device, said parameter extractor retrieving said write speed and energy consumption parameters from said data storage device.

11. The computer system of claim 10, the hibernation energy analyzer further comprising a time analyzer coupled to said parameter extractor, said time analyzer determining the time required to save said hibernation file on said data storage device using said write speed parameter.

12. The computer system of claim 11, wherein said hibernation energy analyzer generates said hibernation energy level as a function of said time and energy consumption parameters.

13. The computer system of claim 12, the hibernation energy analyzer further comprising a hibernation energy padder coupled to said hibernation energy analyzer, said hibernation energy padder providing a spare energy capacity to said computer.

* * * * *